Aug. 16, 1932.     N. C. HARRIS     1,872,079
TRACTION WHEEL
Filed Nov. 18, 1931
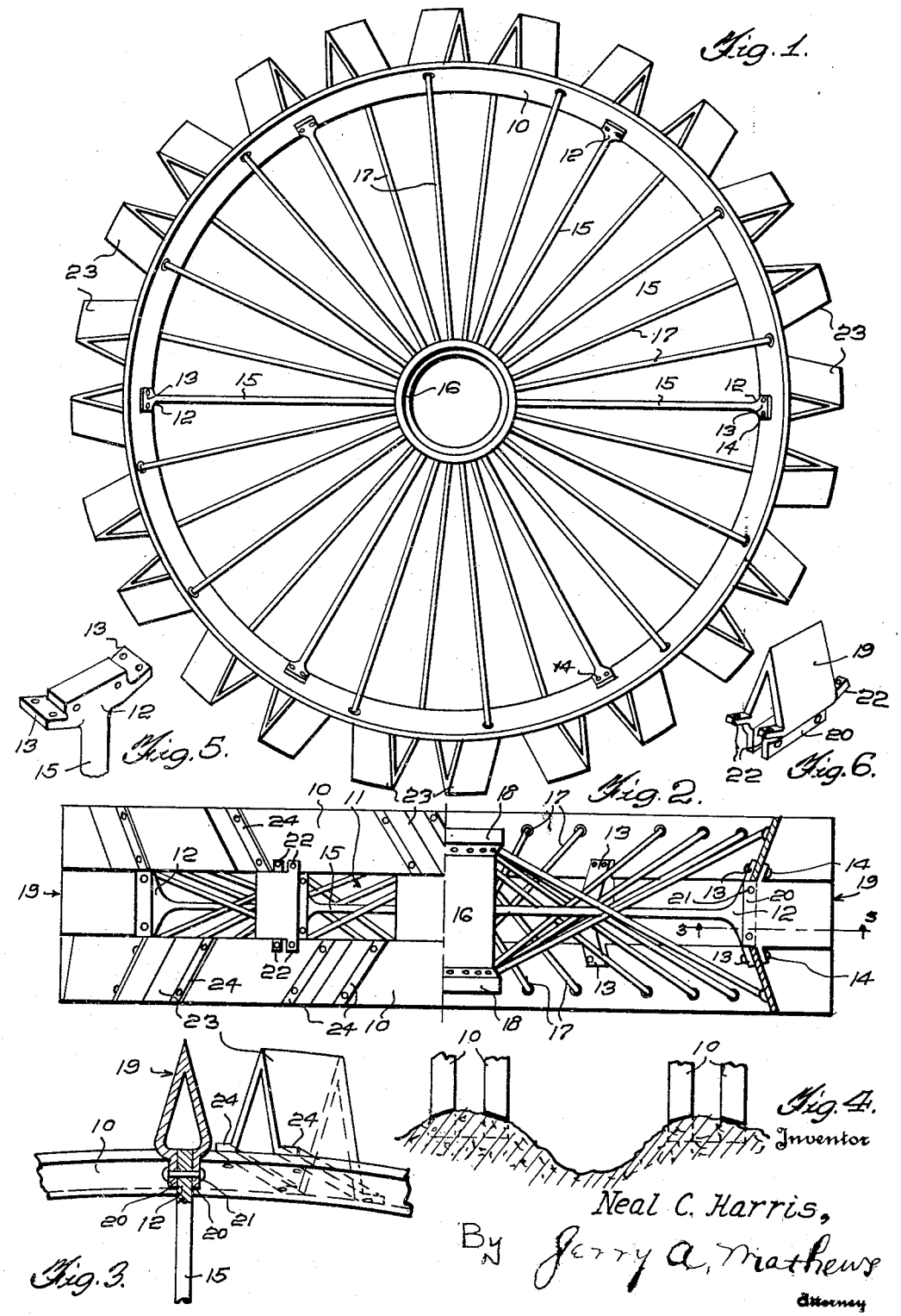
Inventor
Neal C. Harris,
By Jerry A. Mathews
Attorney Patented Aug. 16, 1932

1,872,079

UNITED STATES PATENT OFFICE

NEAL C. HARRIS, OF GUIDE ROCK, NEBRASKA

TRACTION WHEEL

Application filed November 18, 1931. Serial No. 575,913.

My invention relates to improvements in traction wheels, adapted for use upon tractors, or the like, while not necessarily restricted to this use.

An important object of the invention is to provide a wheel of the above-mentioned character, which is strong, light, and will automatically clean its rim portion, during operation.

A further object of the invention is to provide a wheel of the above-mentioned character, which is adapted to travel over the hill produced by a lister, and will be guided during its travel, and will have ample traction.

Other objects and advantages of the invention will be apparent during the course of the following description.

In the accompanying drawing, forming a part of this specification, and in which like numerals are employed to designate like parts throughout the same, Figure 1 is a side elevation of a traction wheel embodying my invention, Figure 2 is a plan view of the same, parts in horizontal section, Figure 3 is a detail section taken on line 3—3 of Figure 2, Figure 4 is a diagrammatic view, showing the traction wheels traveling over the hills produced by a lister, Figure 5 is a fragmentary perspective view of a coupling head, and Figure 6 is a perspective view of a central cleat.

In the drawing, wherein for the purpose of illustration is shown a preferred embodiment of my invention, the numeral 10 designates spaced rim sections, effecting a passage 11 between them. These rim sections are transversely inclined, decreasing in diameter inwardly, as shown, thereby affording a recess at the rim of the wheel. The rim sections 10 are connected by radially disposed heads or couplings 12, the outer ends of which engage between the rim sections 10, and these heads carry outwardly projecting extensions or ears 13. These extensions or ears are arranged upon the inner side of the rim sections and are rigidly attached thereto by rivets or bolts 14.

The heads 12 are rigidly attached to the outer ends of a set of inner spokes 15, which are disposed in the plane of rotation of the wheel. These inner spokes are rigidly attached to a hub 16, at its center.

The numeral 17 designates sets of outer inclined spokes. At their inner ends, these sets of outer spokes are attached to sockets 18, formed upon the ends of the hub 16. The sets of spokes 17 are inclined, or diagonally disposed, and cross each other. The set of diagonal spokes 17 which are attached to the socket 18, at one side of the wheel, has its outer ends attached to the rim section 10, at the opposite side of the wheel. The several spokes are rigidly secured to the hub and rim sections, in the usual manner. It is thus seen that the outer diagonal sets of spokes cross each other, and the inner spokes 15 cross these two sets of diagonal spokes, at their point of crossing. A very strong rigid construction is thereby provided.

Co-acting with the transverse heads or couplings 12 is an inner set of inverted V-shaped cleats 19. Each cleat is provided, at its inner end, with parallel extensions 20, Figure 3, and these extensions are disposed upon opposite sides of the head 12 and are rigidly secured thereto by rivets or bolts 21. The sides of the cleat 19 are provided with apertured ears 22, extending laterally over the rim sections 10, at their inner edges, for a short distance and receiving the rivets 14. The cleats 19 are, therefore, rigidly attached to the heads or couplings 12, an are also directly connected with the rim sections 10, adjacent to their inner edges.

The numeral 23 designates outer sets of inverted V-shaped cleats, which are mounted upon the two rim sections 10. Each cleat 23 is provided, at its base, with outwardly projecting flanges 24, which are rigidly attached to the rim section 10. The basis of the cleat 23 is inclined inwardly toward the passage 11, corresponding to the inclination of the rim section. By this arrangement, the outer edges or apices of the several cleats 19 and 23 terminate at the same circumference, as clearly indicated at Figures 1 and 2.

When the traction wheel is driven along a ridge 25, which hill is produced by a lister, the inwardly inclined rim sections 10 will conform to the crown of the hill, thereby guiding the wheel along the same, while the sets of cleats 19 and 23 will penetrate deep into the hill and afford ample traction for the wheel. The rim sections 10 being spaced, any dirt traveling up with the rim section will slide from these inclined rim sections and discharge through the passage 11. The rim sections are, therefore, self-cleaning, to a large extent.

It is to be understood that the form of my invention herewith shown and described is to be taken as a preferred example of the same, and that various changes in the shape, size and arrangement of parts may be resorted to without departing from the spirit of my invention or the scope of the subjoined claim.

Having thus described my invention, what I claim is:

A traction wheel comprising a pair of spaced parallel rim sections, a hub, an inner set of spokes carried by the hub and disposed within the median plane of the wheel, transverse heads carried by the outer ends of the spokes and separate from the rim sections, said heads having extensions projecting beneath the rim sections, generally V-shaped cleats embodying inwardly diverging sides, said cleats corresponding in number and arrangement with the transverse heads, the sides of each cleat having radial extensions engaging the opposite sides of the corresponding head, and end extensions projecting laterally of the wheel over the outer surface of the rim sections, means to rigidly attach the radial extensions to the transverse heads, and common means to rigidly attach the end extensions of the cleats with the extensions of the transverse heads.

In testimony whereof, I affix my signature.

NEAL C. HARRIS.